(12) United States Patent
Brockway et al.

(10) Patent No.: US 8,341,621 B2
(45) Date of Patent: *Dec. 25, 2012

(54) AUTOMATIC DETECTION AND INSTALLATION OF CLIENT PERIPHERAL DEVICES BY A SERVER

(75) Inventors: Tad Dennis Brockway, Redmond, WA (US); Madan Mohan R. Appiah, Redmond, WA (US); Adam J. Overton, Redmond, WA (US); Ritu Bahl, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 7 days.

This patent is subject to a terminal disclaimer.

(21) Appl. No.: 12/553,279

(22) Filed: Sep. 3, 2009

(65) Prior Publication Data

US 2010/0070969 A1 Mar. 18, 2010

Related U.S. Application Data

(63) Continuation of application No. 10/847,980, filed on May 18, 2004, now Pat. No. 7,600,227, which is a continuation of application No. 09/458,365, filed on Dec. 9, 1999, now Pat. No. 6,789,111.

(51) Int. Cl.
*G06F 9/445* (2006.01)

(52) U.S. Cl. ...................................... 717/176

(58) Field of Classification Search .......... 717/165–178; 709/203, 208, 220; 358/1.15; 710/8, 10, 710/104; 726/4

See application file for complete search history.

(56) References Cited

U.S. PATENT DOCUMENTS

| | | | |
|---|---|---|---|
| 5,580,177 A | 12/1996 | Gase et al. | |
| 5,655,148 A | 8/1997 | Richman et al. | |
| 5,692,111 A | 11/1997 | Marbry et al. | |
| 5,699,495 A | 12/1997 | Snipp | |
| 5,794,032 A | 8/1998 | Leyda | |
| 5,802,365 A | 9/1998 | Kathail et al. | |
| 6,023,585 A | 2/2000 | Perlman et al. | |
| 6,108,733 A * | 8/2000 | Porterfield | 710/104 |
| 6,178,468 B1 | 1/2001 | Rudd et al. | |
| 6,246,485 B1 | 6/2001 | Brown et al. | |
| 6,301,012 B1 * | 10/2001 | White et al. | 358/1.15 |
| 6,327,613 B1 | 12/2001 | Goshey et al. | |

(Continued)

OTHER PUBLICATIONS

Miloushev et al, "Dynamic Container for Software Parts", U.S. Appl. No. 60/149,624, filed Aug. 16, 1999, pp. 1-114 <60149624_Specs.pdf>.*

(Continued)

*Primary Examiner* — Tuan A Vu
(74) *Attorney, Agent, or Firm* — Lee & Hayes, PLLC

(57) ABSTRACT

A server-client system is configured to automatically detect and install peripheral devices, such as printers, scanners, etc. that are attached to a client. The server is configured to detect the peripheral device and install a driver that is compatible with the peripheral device. The I/O queue created for the peripheral device is redirected to the port to which the peripheral device is connected.

20 Claims, 5 Drawing Sheets

U.S. PATENT DOCUMENTS

| | | |
|---|---|---|
| 6,330,611 B1 | 12/2001 | Itoh et al. |
| 6,397,327 B1 | 5/2002 | Klebanov |
| 6,401,124 B1 | 6/2002 | Yang et al. |
| 6,463,540 B1 | 10/2002 | Lelong et al. |
| 6,772,420 B1 | 8/2004 | Poger et al. |
| 6,834,259 B1 | 12/2004 | Nicholson et al. |
| 2001/0013948 A1* | 8/2001 | Fujiwara et al. ............ 358/1.15 |
| 2003/0135850 A1* | 7/2003 | Miloushev et al. ........... 717/165 |

OTHER PUBLICATIONS

Miloushev et al, "Reusable Software Parts", U.S. Appl. No. 60/149,371, filed Aug. 16, 1999, pp. 1-812 <60149371_Specs.pdf>.*

Tidrow, et al., "Windows 95, Installation and Configuration Handbook", QUE Corporation, copyright 1995, pp. 9-18.

* cited by examiner

AUTOMATIC DETECTION AND INSTALLATION OF CLIENT PERIPHERAL DEVICES BY A SERVER

RELATED APPLICATIONS

This application is a continuation application of U.S. patent application Ser. No. 10/847,980 filed May 18, 2004, entitled "Automatic Detection And Installation Of Client Peripheral Devices By A Server," to Brockway et al, since issued as U.S. Pat. No. 7,600,227 on Oct. 6, 2009, which is a continuation of U.S. patent application Ser. No. 09/458,365 filed Dec. 9, 1999, entitled "Automatic Detection and Installation of Client Peripheral Devices By A Server," to Brockway et al, which issued as U.S. Pat. No. 6,789,111 on Sep. 7, 2004.

TECHNICAL FIELD

This invention relates to server-client systems and, in particular, to a server-client system in which the server is configured to automatically detect and install peripheral devices attached to a client.

BACKGROUND

Plug and Play (PnP) technology is an architecture designed and developed by Microsoft Corporation and various independent hardware and software vendors that facilitates the integration of peripheral devices, such as printers, scanners, card readers, etc., into a personal computer system. First introduced with Windows® 95, PnP peripheral devices are configured to identify themselves to the computer system to which they are attached. A PnP compatible operating system receives identifying information and uses it to automatically locate and load a peripheral device driver that is either provided by the user or retrieved from a driver library stored at a location accessible by the computer. Loading the peripheral device driver—also referred to as installing the peripheral device—includes defining an input/output (I/O) queue that is used to queue output to the peripheral device and/or receive input from the peripheral device. The installation is completed without requiring significant user interaction.

Before PnP technology was developed, a system user was required to install a peripheral device manually each time such a device was connected to the system. Manual installation of peripheral device drivers was a burdensome and time-consuming task for the user. It required the user to notify the operating system that the user had connected a peripheral device to the system. The user then had to locate and identify a peripheral device driver for the peripheral device, notify the system of the location of the peripheral device driver and identify an I/O port of the computer to which the peripheral device was attached so that the operating system could redirect an I/O queue for the device to the I/O port. The advent of PnP technology relieved the user from the burdens associated with manually installing peripheral device.

Although PnP technology has facilitated installation of peripheral devices by users with little or no knowledge of computer hardware or software operations, similar technology does not exist for systems in which multiple users simultaneously share the computing resources of a single machine In such a scenario, client machines are connected to a server computer using a network. The client machines can be standalone computers or terminals. A terminal does not have the processing capability of a computer, but it does have the ability to utilize the processor in the server to execute applications and to provide a user interface for I/O operations.

A server in this environment typically has an operating system that can run several client sessions concurrently. Each client user has access to resources of the server, including the processor, data storage, application programs, etc. Software applications that are resident on the server are available to each client for independent execution by the client. Each session is independent from other clients connected to the server and, therefore, one client cannot access information relating to another client. In this manner, the server provides a logically independent machine for each client connected to the server.

Client users frequently connect peripheral devices to the client computers. For example, a client user may wish to connect a printer to the user's client computer (a "local" printer) to print data generated by an application that is running on the server computer. To do this, the user must manually install the local printer as described above and redirect the printer queue created by the server to the I/O port of the client computer to which the printer is connected. As previously stated, manual installation of peripheral devices is undesirable because it requires significant time and effort on the part of the user.

SUMMARY

Described herein is a server-client system in which the server is configured to automatically detect and install peripheral devices attached to a client. The server is configured to detect a peripheral device connected to a client, install a driver that is compatible with the peripheral device, and redirect an I/O queue created for the peripheral device to a port of the client to which the peripheral device is connected.

Two distinct situations are considered based on whether or not the client is equipped with an operating system having a PnP subsystem. If the client is PnP compatible, the server utilizes high-level application program interfaces (APIs) to detect the peripheral devices connected to the client and determine peripheral identifiers associated with the peripheral devices. The peripheral identifiers are passed to the server, and the server installs a compatible peripheral device driver, creates an I/O queue for the peripheral device, and redirects the I/O queue to the I/O port on the client to which the peripheral device is connected.

The other situation is where the client is not PnP compatible. One case in which this arises is when the client is a terminal rather than a computer. Another case is when the client is a computer based on an older system that runs a pre-Windows® 95 operating system, such as Windows® 3.1. In these cases, the server cannot rely on the client to automatically identify local peripheral devices.

It is noted that a peripheral identifier is any designation assigned to a peripheral device by which a system can uniquely identify the peripheral device and use to recognize a compatible driver for use with the peripheral device. A peripheral identifier can be a PnP identifier, a device driver name, an arbitrarily assigned variable, or the like.

To automate peripheral device detection and installation in a server-client system in which the client is not based on PnP architecture, the client periodically polls it physical I/O ports for the existence of a connected peripheral device. This may or may not be done in response to a request from the server. If a new device is detected, information about the device, such as a peripheral identifier associated with the device, is sent to the server. The server then utilizes the information sent from the client to attempt to locate and install a peripheral device driver that is compatible with the peripheral device connected to the client. An I/O queue associated with the peripheral device is then automatically created and redirected to the I/O port to which the detected peripheral device is attached.

One way that the server can determine when a newly connected peripheral device is found is by including in its periodic request to the client a specific condition that the client return an enumeration of all peripheral devices connected to the client. The client queries the I/O ports of the client to make this determination and transmits the enumeration back to the server, where the server stores the enumeration in server memory. On a subsequent request for a similar enumeration, the server compares the enumeration received from the client in response to the subsequent request with the enumeration stored in memory. If a peripheral device is listed in the subsequent enumeration which was not listed in the initial enumeration, then the server can identify the recent addition as a peripheral device that is newly connected.

Similarly, if the initial enumeration lists a peripheral device that is not listed in the subsequent enumeration, the server will also be aware that the identified peripheral device has been removed from the system and can make accommodations for deactivating or removing that peripheral device from the system.

The same general procedure may also be initiated by the client rather than by a request from the server. In that instance, the client detects a newly connected peripheral device and forwards information relating to the connected peripheral device to the server. When the new peripheral device is identified to the server, it determines whether the device has already been announced by the client and resolves any conflicts that may arise therefrom. The server then installs a driver for the peripheral device. For clients that can detect the removal of a device, information about the device removal is forwarded to the server so that the server can make accommodations for removing or uninstalling the peripheral device from the system.

There are other ways that the server can determine when a peripheral device is connected to the system. The server can request the client to determine what I/O queues are present on the client. The client may then determine the peripheral device identifying information from these queues and relay the information to the server. Alternatively, the client may simply access system device registry information on the client which will indicate which peripheral devices are connected to the client and to what I/O port they are connected. These methods are also described in more detail below.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
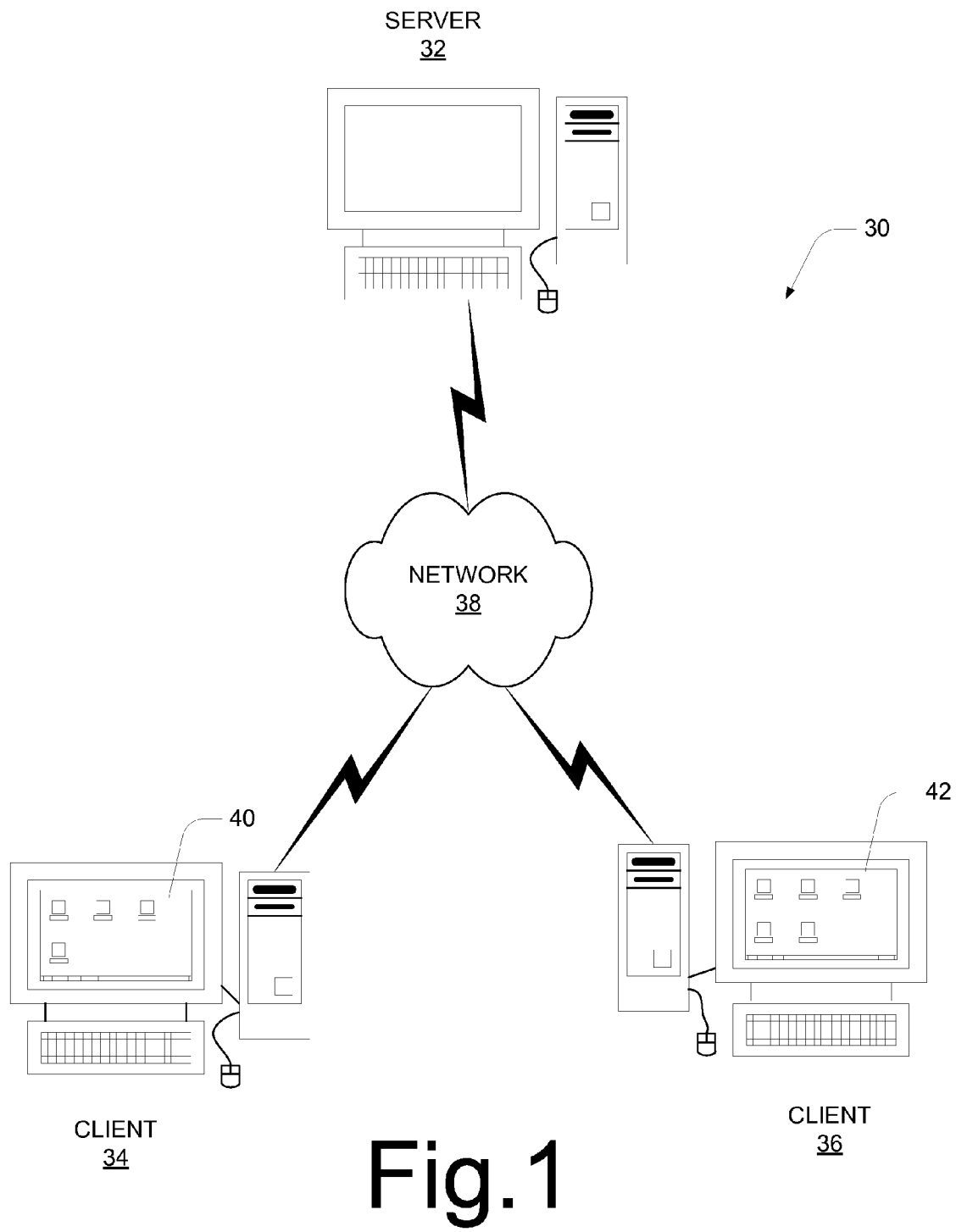
FIG. 1 is a diagrammatic illustration of a server/client system.

FIG. 1 shows a server/client computer system 30 having a server 32, a first client 34 and a second client 36 interconnected via a network 38. The server 32 and the clients 34, 36 have modems or network cards, which facilitate access (direct or otherwise) to the network 38 so that the server 32 and the clients 34, 36 can exchange information over the network 38. The clients 34, 36 each have a desktop 40, 42 interface displayed.

The server 32 is a computer. A client 34, 36 may be a computer having Plug and Play capability, a computer that is not Plug and Play compatible, or a terminal, which does not have the processing capability of a computer. Implications of utilizing the different types of clients will be discussed in greater detail below.

It is noted that, although the server/client computer system 30 depicted in FIG. 1 has a first client 34 and a second client 36, there may be one to any number of clients connected to the server 32. The number of clients that may be connected to a server is limited only by the architecture of a particular server.

The server 32 is configured to provide a logically independent machine for each client 34, 36 connected to the network 38. That is, the server 32 establishes a session for each client 34, 36, provides the desktop 40, 42 for each client 34, 36, and makes server resources available to the clients 34, 36. Such resources include, but are not limited to, allocations of processor time, memory, data storage, video processing, application programs, etc. A user of either of the clients 34, 36 interacts with the desktop 40, 42 on the client 34, 36 to run software applications that reside on the server 32. While the user provides input to and receives output from the client 34, 36, most processing is performed at the server 32.

The network 38 provides a communications link between the server 32 and the clients 34, 36 through which data is transmitted. The network 38 may be a local area network (LAN), a wide area network (WAN), the Internet, or the like, provided that it can accommodate server/client functionality.

Figure 2:
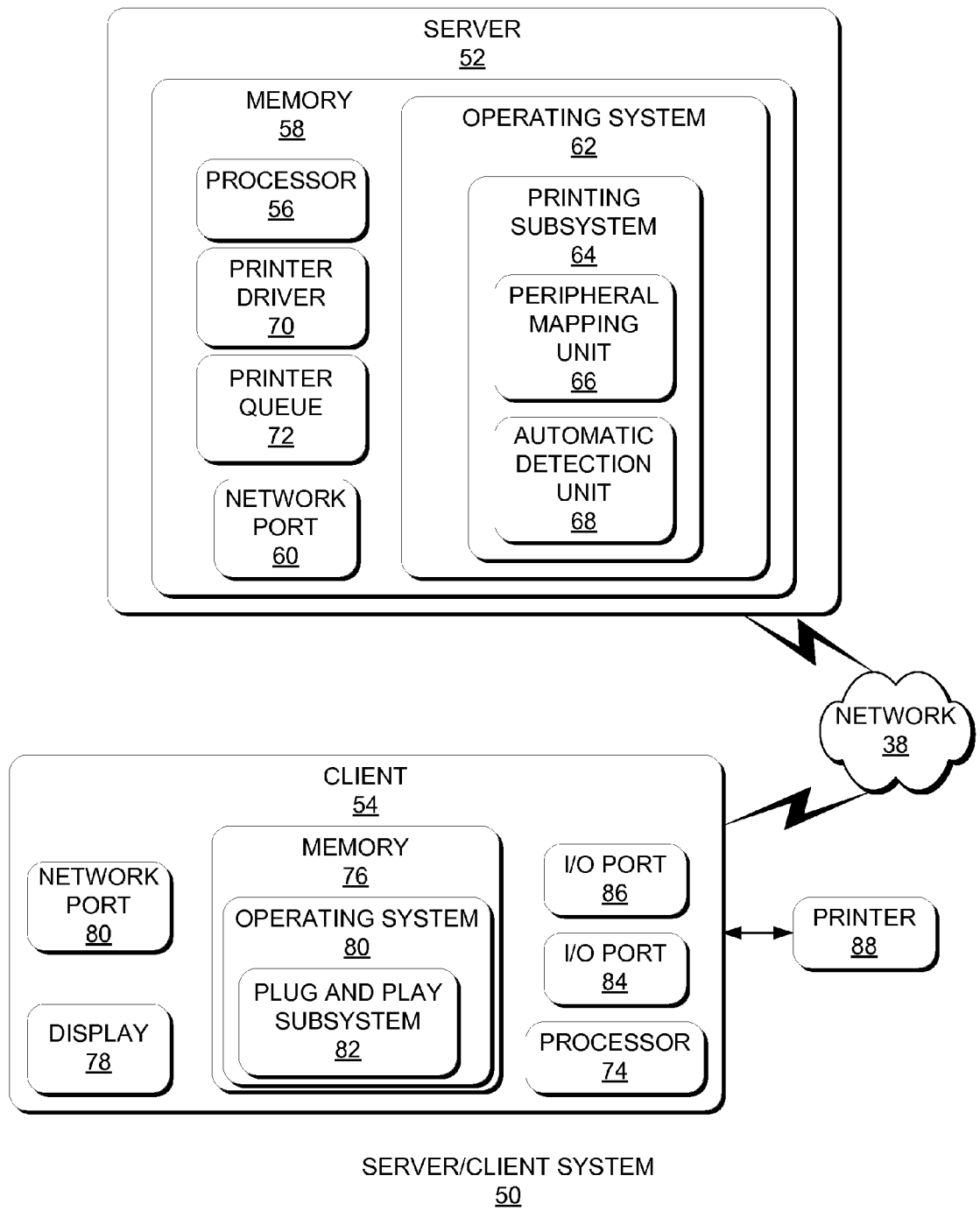
FIG. 2 is a block diagram of a server/client system utilizing a client having Plug and Play capability.

FIG. 2 shows a server/client system 50 having a server 52 and a client 54. The server 52 includes a processor 56 and memory 58. The server 52 also has a network port 60, which facilitates access to the network 38. The network port 60 may be implemented as a modem, network card, or other device, which interfaces the server 52 to the network 38.

The server 52 can be implemented as a common personal computer or other type of computer, such as a laptop computer, etc. The server 52 runs an operating system 62, which is stored in memory 58 and executes on the processor 56. The operating system 62 must have multitasking capability such as that provided with a Windows® brand operating system from Microsoft Corporation (e.g., Windows® 2000, Windows® 98, Windows® 95, Windows® NT, or other derivative of Windows®). However, other multi-tasking operating systems may be used.

The server 52 has a printing subsystem 64 implemented in the operating system 62 stored in memory 58. The printing subsystem 62 is used to direct all operations involving printers and printing, including installing printers, creating and managing printer queues, removing printers, uninstalling printers, etc. The printing subsystem includes a peripheral mapping unit 66 that is configured to map, or redirect, printer queues to printer ports. The printing subsystem 64 also includes an automatic detection unit 68 that is configured to detect peripheral devices connected to the server/client system 50. The function of the automatic detection unit 68 is described in greater detail below.

The server 52 is shown having a printer driver 70 and a printer queue 72 installed and resident within the memory 58. It is noted, however, that the server 52 will only include the printer driver 70 and the printer queue 72 when a printer has been connected to the system 50 and installed on the server 52. The printer driver 70 is a printer-specific software program that provides an interface between a printer and the server 52 and allows the server 52 to provide print functions via the printer. When the printer driver 70 is installed on the server 52, the printer queue 72 is created. The printer queue 72 accepts print jobs from the server 52 and queues them for printing. It is noted that if the peripheral device is a device other than an a printer, the printer driver 70 will be a device driver, if required, for that peripheral device.

The client 54 includes memory 76 and a display 78. Similar to the server 52, the client 54 also has a network port 80 to facilitate access to the network 38. The network port 80 may be implemented as a modem, network card, or other device, which interfaces the client 54 to the network 38. The client 54 also includes a peripheral detection subsystem embodied as a Plug and Play subsystem 82 resident in the memory 76, a first I/O port 84, a second I/O port 86, and a printer 88 connected to the first I/O port 84.

Figure 3:
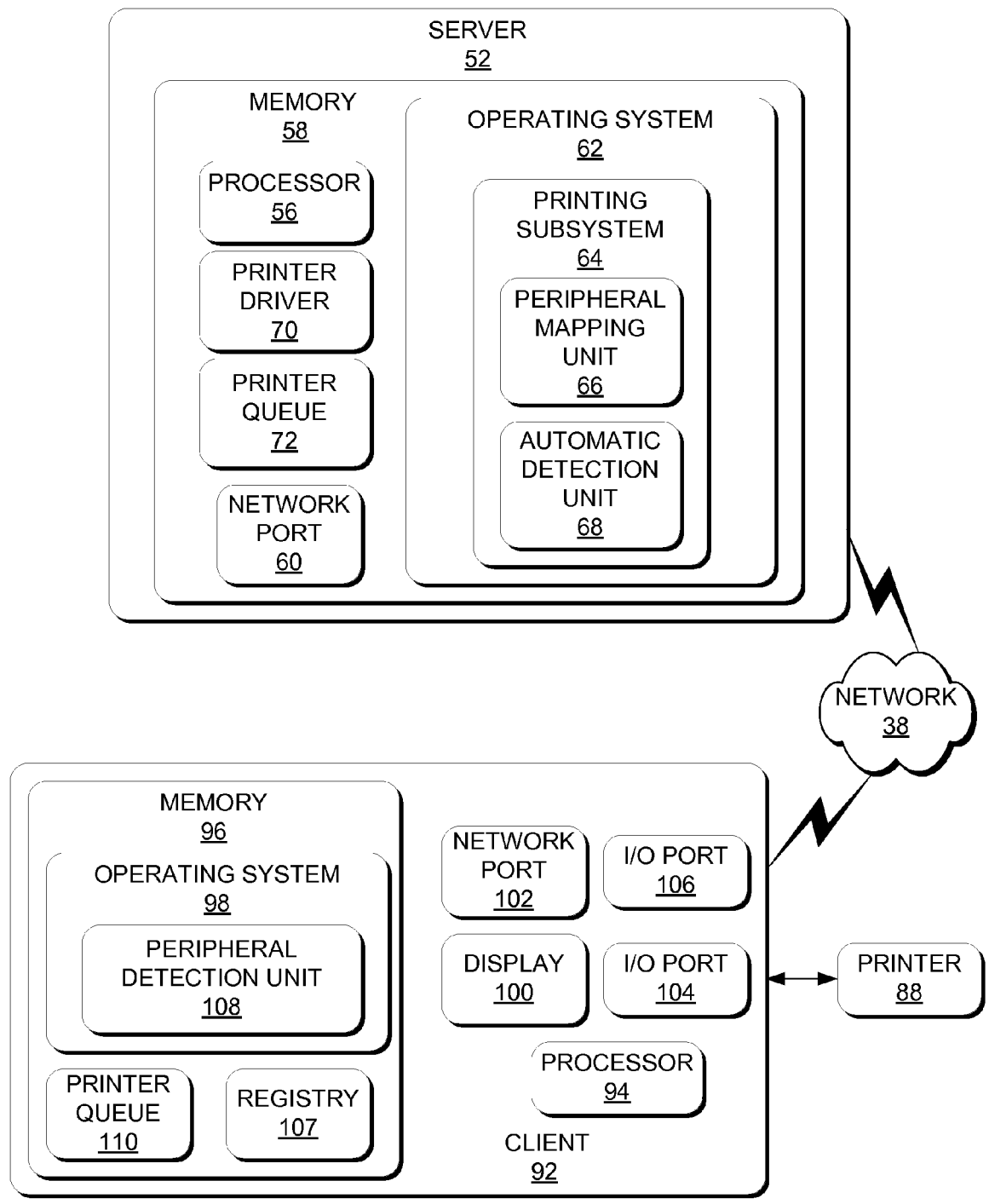
FIG. 3 is a block diagram of a server/client system utilizing a client that does not have Plug and Play capability.

FIG. 3 shows a server/client system 90 comprising the server 52 shown in FIG. 2 and a client 92 that does not have a Plug and Play subsystem. The client 92 is similar to the client 54 shown in FIG. 2 in that it includes a processor 94, memory 96, an operating system 98 resident in the memory 96, a display 100, a network port 102, a first I/O port 104 and a second I/O port 106. The client 92 has a system registry 107 located in the memory 96. Instead of the Plug and Play subsystem 82 shown in FIG. 2, the client 92 has a peripheral detection unit 108. The peripheral detection unit 108 may be an integral part of the operating system 98 or it may be a software function that is callable by the operating system 98 or by application programs. The server/client system 90 also includes the printer 88, which is connected to the first I/O port 104. A printer queue 110 is installed in the memory 96 for the printer 88.

It is noted that, although the client 92 is depicted as being a computer, the client 92 may also be a terminal, which does not have the mass storage or processing capabilities of a computer. The present invention functions similarly whether the client 92 is a computer or a terminal. However, if the client 92 is a terminal, the processor 74, operating system 80 and Plug And Play subsystem 82 will not normally be present. A terminal simply provides input/output functions to a client user, while utilizing the processor 56 on the server 52.

Figure 4:
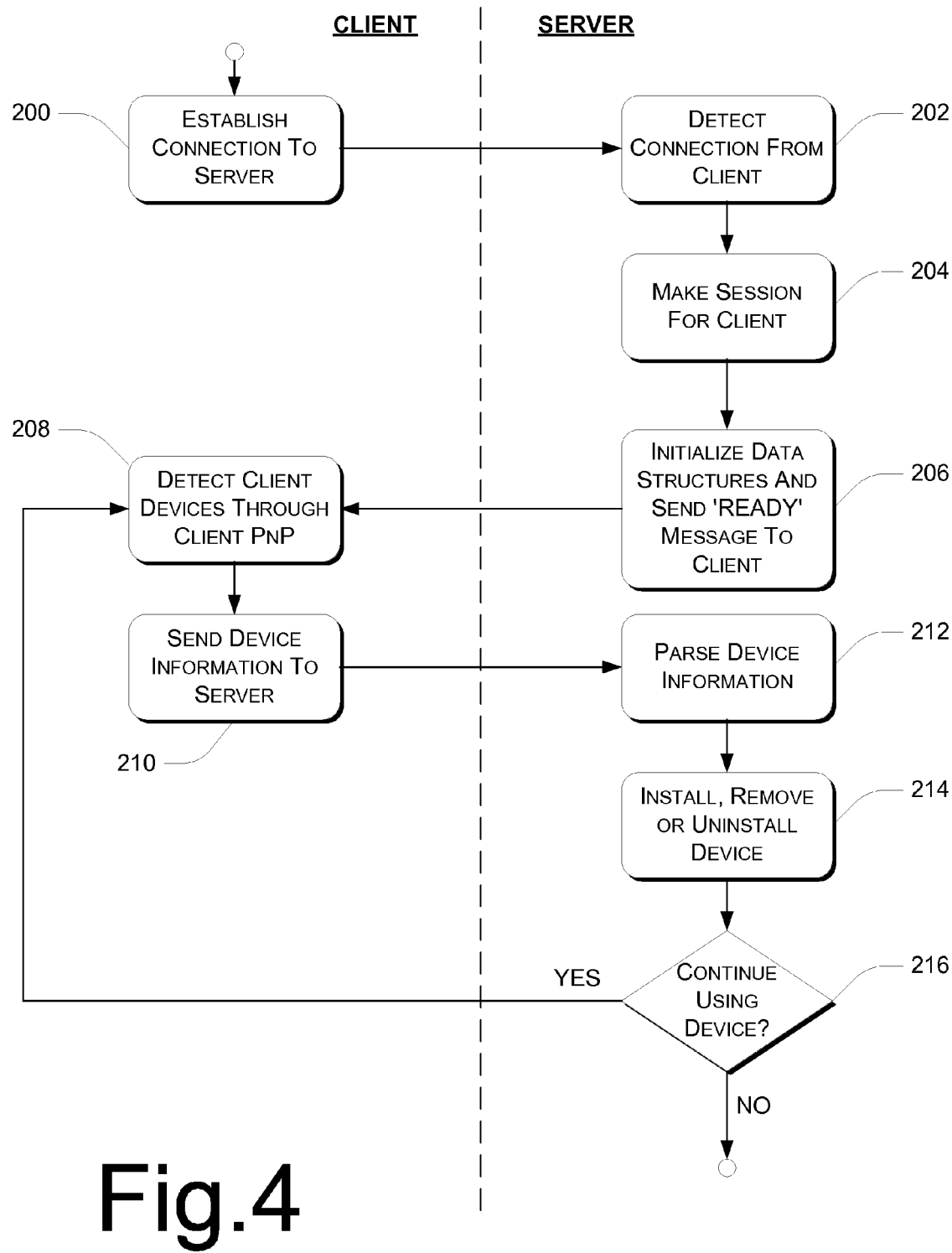
FIG. 4 is a flow diagram of a method for automatically detecting, in a server, peripheral devices connected to a client having a Plug And Play subsystem.

FIG. 4 is a flow diagram depicting a method for automatically identifying and installing peripheral devices connected to a client which has Plug and Play capability. The method is described with continuing reference to FIGS. 1 and 2.

At step 200 in FIG. 4, the client 54 establishes a connection with the server 52. After the client 54 establishes the connection, the client 54 waits for an announcement package from the server 52. When the server 52 detects the connection from the client 54 (step 202), the server 52 sets up a session for the client 54 at step 204. At step 206, the server 52 initializes the data structures necessary to provide the session for the client 54. When this is completed, the server 52 sends an announcement package to the client 54, which signals the client 54 that it can commence interactive communications with the server 52.

As previously discussed, the client 54 is a computer having a Plug and Play automatic detection subsystem. A Plug and Play subsystem is designed to continuously monitor I/O ports and notify the host computer when a new device is connected to the system, or when a connected device is disconnected from the system. Peripheral devices, such as printers, each have a unique Plug and Play identifier that is periodically and continuously transmitted by the peripheral device to the I/O port to which it is connected. When the peripheral device is initially connected to the I/O port, the host computer detects the signal transmitted from the peripheral device. The Plug and Play subsystem of the host computer is configured to detect the presence of the peripheral device, recognize the Plug and Play identifier associated with the peripheral device, identify the manufacturer and model number of the peripheral device from the Plug and Play identifier, and configure the host computer to operate in conjunction with the peripheral device.

Since the Plug and Play subsystem 82 of the client 54 executes a process in which it detects and identifies peripheral devices connected at the client 54 and installs peripheral device drivers on the client 54, there is no need for the server 52 to independently detect and identify the peripheral devices. The server 52 simply requests information, e.g. peripheral identifiers, from the client 54 that pertains to peripheral devices connected to the client 54 (step 208 of FIG. 4). This step may also be included in a system in which the client 54 does not have a Plug and Play subsystem 82, provided that the client 54 has some way to detect when a peripheral device is physically connected to the client 54.

The Plug and Play subsystem 82 of the client 54 is configured to transmit the Plug and Play identifier of a newly connected or newly disconnected peripheral device to the automatic detection subsystem 68 of the server 52 at step 210. When the server 52 receives this information at step 212, it parses the information to determine the identity of the peripheral device, whether the device is newly connected or newly disconnected, and how the server 52 is to respond to the change.

At step 214, the server 52 installs, removes or uninstalls the identified peripheral device, depending on the situation. If, for instance, the Plug and Play subsystem 82 detects that the printer 88 is newly connected, the Plug and Play subsystem will obtain the Plug and Play identifier for the printer 88 and transmit the Plug and Play identifier to the automatic detection unit 68 of the printing subsystem 64 on the server 52. The automatic detection unit 68 parses the information to determine the manufacturer and the model number of the printer 88 and to determine that the printer driver 70 corresponding to the printer 88 should be installed on the server 52. The printer driver 70 is installed on the server 52 and the printer queue 72 is created. The peripheral mapping unit 66 then redirects the printer queue 72 to the I/O port 84 to which the printer 88 is connected. It is noted that, in the alternative, the client 52 may associate a driver name to the peripheral identifier and transmit the driver name to the server 52, as opposed to transmitting the peripheral identifier to the server 52 for the server 52 to determine the driver associated with the peripheral identifier.

At step 216, if the client remains in use, the process is repeated from step 208, where the Plug and Play subsystem 82 continues to monitor the I/O ports 84, 86 for a change in the status of connected peripheral devices.

Figure 5:
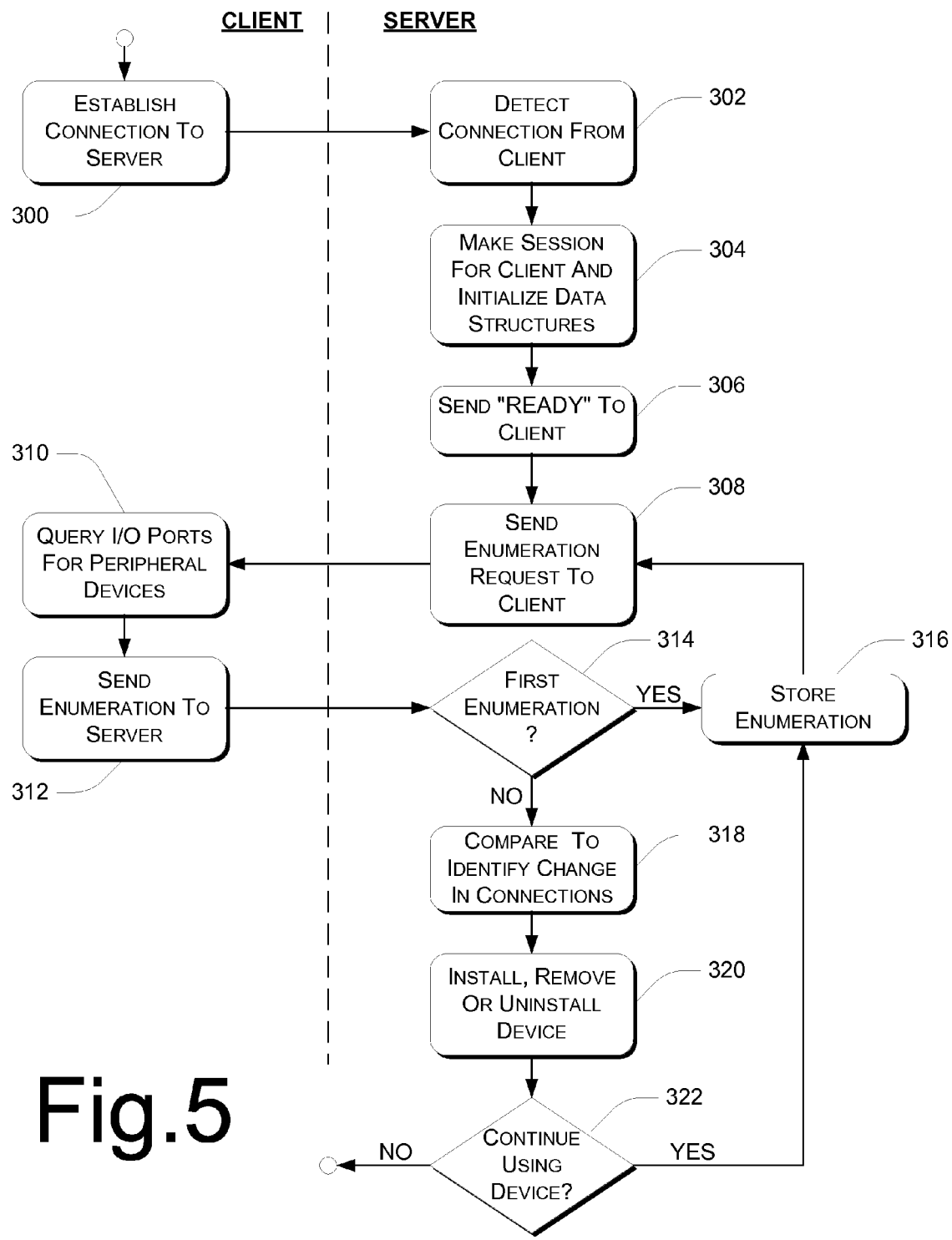
FIG. 5 is a flow diagram of a method for automatically detecting, in a server, peripheral devices connected to a client that does not have a peripheral detection subsystem.

FIG. 5 is a flow diagram depicting a method for automatically identifying and installing peripheral devices connected to a client that does not have Plug and Play capability. The method is described with continuing reference to FIG. 1 and FIG. 3.

At step 300, the client 92 establishes a connection with the server 52. After the client 92 establishes the connection, the client 92 waits for an announcement package from the server 52. When the server 52 detects the connection from the client 92 (step 302), the server 52 sets up a session for the client 92 and initializes the data structures necessary to provide the session for the client 92. At step 306, the server 52 sends an announcement package to the client 92, which signals the client 92 that it can commence interactive communications with the server 52.

Since the client 92 is a computer that is not Plug and Play compatible, there is no integrated process by which the client 92 identifies peripheral devices attached to it. The server 52 therefore initiates a process designed to make this determination.

At step 308, the automatic detection unit 68 of the server 52 sends an enumeration request to the peripheral detection unit 108 of the client 92. The peripheral detection unit 108 of the client 92 may be a discrete software module resident in the memory 96 of the client 92, or it may be fully integrated into the operating system 98 of the client 92, if the client 92 is a computer. The peripheral detection unit 108 is configured to receive a request from the server 52 directing the peripheral detection unit 108 to identify peripheral devices connected to the I/O ports 104, 106 of the client 92 and transmit the identifying information back to the server 52. As previously noted, this enumeration request may not be necessary if the client 54 has the capability to detect newly connected peripheral devices.

At step 310, the peripheral identification unit 108 of the client 92 detects which, if any, peripheral devices are attached to the I/O ports 104, 106 of the client 92. One way this is accomplished is for the peripheral identification unit 108 of the client 92 to query the I/O ports 104, 106, one at a time, for an identifying response from an attached device, in this case, the printer 88. As noted above, Plug and Play printers, such as the printer 88 in FIG. 3, continuously transmit an identifying signal to the port to which they are connected. The query from the peripheral detection unit 108 is designed to detect this identifying information.

For example, the peripheral identification unit 108 queries I/O port 104 for identifying information for any connected peripheral device. The peripheral detection unit 108 detects the identifying signal transmitted by the printer 88. The peripheral detection unit 108 correlates the Plug and Play identifier for the printer 88 which is contained in the identifying signal to the I/O port 104.

The peripheral detection unit 108 proceeds to query I/O port 106 for identifying information for any connected peripheral device. No peripheral device is connected to I/O port 106, so the peripheral detection unit 108 does not receive an identifying signal associated with I/O port 106.

Another way in which the peripheral detection unit 108 may determine which, if any, peripheral devices are connected to the client 92 is to access system information already present on the client 92. For instance, since the client 92 has the printer 88 connected to it, the client 92 should have already installed the printer 88 and created the printer queue 110 for the printer 88. This is true whether the client has a Plug and Play subsystem 82—in which case the installation was automatic—or whether the installation was manual in a non-Plug-and-Play system. Therefore, the peripheral detection unit 108 simply enumerates the queues set up on the client 92 to determine which peripheral devices are connected thereto. In the present example, the client 92 would identify the printer queue 100 in response to an enumeration request. It would then send this information back to the server 52.

The peripheral detection unit 108 may also identify connected peripheral devices by accessing the system registry 107 of the client 92. The system registry 107 contains, among other things, a listing of peripheral devices installed on the client 92. The peripheral detection unit 108 may simply read this list to enumerate the connected peripheral devices. The information would then be transmitted to the server 52.

For convenience, this discussion will focus on enumerating the attached peripheral devices by querying the individual I/O ports to obtain connection information.

After the client 92 has queried all client I/O ports, it transmits an enumeration of the peripheral devices connected to the I/O ports to the server 52 at step 312. The enumeration includes the peripheral identifier associated with the peripheral device. In the present example, the enumeration contains the peripheral identifier for the printer 88, and information that the printer 88 is connected to I/O port 104. If the enumeration is the first such enumeration received from the client 92 (step 314), the enumeration is stored at step 316 for comparison with subsequent enumerations. If there is a previous enumeration, the server 52 compares the current enumeration with the previous enumeration at step 318. If the peripheral identifier of a peripheral device, such as the printer 88, did not appear on the previous enumeration but is present on the current enumeration, the server 52 recognizes the peripheral device as being newly connected and installs the peripheral device based on its peripheral identifier. At step 320 in FIG. 5, the server 52 installs the printer 88 and creates the printer queue 110 in the memory 96 of the client 92.

Conversely, if a peripheral device is removed from the client 92, then at some point, the peripheral device appearing on a previous enumeration will be absent from a subsequent enumeration. In this situation, the client 92 will recognize that a peripheral device has been newly disconnected and the client 92 will either remove or uninstall the peripheral device from the system 90. It is also noted that, in the event that the client 92 initiates peripheral device detection without requiring a request from the server 52, the removal of a peripheral device will be detected by the client 92 and information relating to the removed device is sent to the server 52 for appropriate processing.

It is noted that there is a significant difference between "removing" a peripheral device and "uninstalling" a peripheral device. Device removal temporarily disables a device by deleting any memory copy of the device information from the system. However, the device driver that was installed for the device is still available for later use. This way, if the device is physically reattached to the system, the system can simply "restart" the device.

A device uninstall is more permanent that a device removal. With a device uninstall, the device driver is deleted from the system together with any memory copy of the device information. If the device is physically reattached to the system, the device must be reinstalled before it will be operational.

The system and method as described herein overcomes the problems of having to manually install client peripheral devices on a server. A client user can now utilize the advantage of automatically detecting and installing peripheral devices connected to the client.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for automatically configuring a server for use with a peripheral device connected to an input/output port of a client computer, the method comprising:
   detecting a connection from the client computer by the server and establishing a session for the client computer;
   sending from the server to the client computer one or more requests for an enumeration of client peripheral devices physically connected to the client computer, the one or more requests directing the client computer to detect a presence of the peripheral device by accessing system device registry information on the client computer and determining a peripheral identifier that uniquely identifies the peripheral device physically connected to the input/output port of the client computer;
   receiving the peripheral identifier at the server;
   based on the received peripheral identifier, installing on the server a peripheral driver and a queue for use with the peripheral device that is physically connected to the client computer; and
   automatically redirecting data from the queue on the server to the input/output port of the client computer to which the peripheral device is physically connected.

2. The method recited in claim 1, further comprising:
   physically removing the peripheral device from the input/output port of the client computer; and
   removing the peripheral driver used with the peripheral device identified by the received peripheral identifier.

3. The method recited in claim 1, further comprising:
   physically removing the peripheral device from the input/output port of the client computer; and
   uninstalling the peripheral driver used with the peripheral device identified by the received peripheral identifier.

4. The method recited in claim 1, wherein the identified peripheral device is a Plug And Play compatible peripheral device.

5. The method recited in claim 1, wherein the identified peripheral device is a printer.

6. The method recited in claim 1, wherein receiving the peripheral identifier further comprises receiving a Plug and Play identifier corresponding to the peripheral device.

7. The method recited in claim 1, wherein receiving the peripheral identifier further comprises comparing a first enumeration of peripheral devices received from the client computer by the server with a second enumeration of peripheral devices received from the client computer by the server.

8. The method as recited in claim 1, further comprising the server not detecting the peripheral device or not identifying the peripheral device.

9. A client/server computer system, comprising:
   at least one client that is physically connected to a printer through an input/output port of the at least one client, the at least one client operating to detect a presence of the printer by accessing system device registry information of the at least one client to receive a peripheral identifier uniquely identifying the printer newly connected to the input/output port of the at least one client; and
   a server comprising:
      a printing subsystem configured to receive the peripheral identifier from the at least one client in response to at least one request by the printing subsystem to the at least one client for an enumeration of peripheral identifiers corresponding to printers connected at the at least one client;
      an automatic detection unit that determines a printer driver associated with the peripheral identifier and installs the printer driver on the server, including setting up a print queue on the server for the printer; and
      a peripheral mapping unit to automatically redirect printer data from the print queue on the server to the input/output port of the at least one client to which the printer is physically connected;
   wherein the at least one client establishes a connection with the server and transmits the peripheral identifier to the server; and
   wherein the server detects the connection from the at least one client, establishes a session for the at least one client, and sends a signal to the at least one client to commence communications therewith.

10. The client/server system as recited in claim 9, wherein the printer is a Plug And Play compatible printer.

11. The client/server system as recited in claim 9, wherein the printing subsystem received the peripheral identifier without requiring interaction by a user.

12. The client/server system as recited in claim 9, wherein the printer driver is installed without requiring interaction by a user.

13. The client/server system recited in claim 12, further comprising the server being configured to not detect the printer and to not identify the printer.

14. A method for automatically configuring a server for use with a peripheral device connected to an input/output port of a client computer, the method comprising:
   detecting a connection from the client computer by the server and establishing a session for the client computer;
   initializing one or more data structures to provide the session for the client computer and sending a signal to the client computer to commence communications with the server;
   sending from the server to the client computer one or more requests for an enumeration of client peripheral devices physically connected to the client computer, the one or more requests directing the client computer to detect a presence of the peripheral device by accessing system device registry information on the client computer and determining a peripheral identifier that uniquely identifies the peripheral device physically connected to the input/output port of the client computer;
   receiving the peripheral identifier at the server; and
   based on the received peripheral identifier, installing on the server a peripheral driver for use with the peripheral device that is physically connected to the client computer.

15. The method recited in claim 14, further comprising:
   physically removing the peripheral device from the input/output port of the client computer; and
   removing the peripheral driver used with the peripheral device identified by the received peripheral identifier.

16. The method recited in claim 14, further comprising:
   physically removing the peripheral device from the input/output port of the client computer; and
   uninstalling the peripheral driver used with the peripheral device identified by the received peripheral identifier.

17. The method recited in claim 14, wherein the identified peripheral device is a Plug And Play compatible peripheral device.

18. The method recited in claim 14, wherein the identified peripheral device is a printer.

19. The method recited in claim 14, wherein receiving the peripheral identifier further comprises receiving a Plug and Play identifier corresponding to the peripheral device.

20. The method recited in claim 14, wherein the session provided for the client computer by the server is within a machine that is logically independent from one or more other machines on the server that concurrently support one or more other sessions for one or more other client computers.

* * * * *